United States Patent [19]

Tokar et al.

[11] Patent Number: 5,454,858
[45] Date of Patent: Oct. 3, 1995

[54] PROCESS OF USING MIST COLLECTOR CARTRIDGE

[75] Inventors: Joseph C. Tokar; Mervin E. Wright, both of Apple Valley; Timothy H. Grafe, Minneapolis; James A LeBlanc, Eden Prairie, all of Minn.

[73] Assignee: Donaldson Company, Inc., Minneapolis, Minn.

[21] Appl. No.: 353,640

[22] Filed: Dec. 12, 1994

Related U.S. Application Data

[62] Division of Ser. No. 107,967, Aug. 16, 1993, Pat. No. 5,415,676.

[51] Int. Cl.$^6$ ................................................. B01D 46/00
[52] U.S. Cl. ................................ 95/285; 55/498; 55/524
[58] Field of Search ........................ 55/498, 500, 524; 95/241, 285

[56] References Cited

U.S. PATENT DOCUMENTS

| | | |
|---|---|---|
| 3,290,870 | 12/1966 | Jensen . |
| 3,488,928 | 1/1970 | Tarala . |
| 3,802,160 | 4/1974 | Foltz . |
| 4,160,684 | 7/1979 | Berger, Jr. et al. . |
| 4,211,543 | 7/1980 | Tokar et al. . |
| 4,243,397 | 1/1981 | Tokar et al. . |
| 4,452,619 | 6/1984 | Wright et al. . |
| 4,676,807 | 6/1987 | Miller et al. . |
| 4,759,782 | 7/1988 | Miller et al. . |
| 4,878,929 | 11/1989 | Tofsland et al. . |
| 5,082,476 | 1/1992 | Kahlbaugh et al. . |
| 5,129,923 | 7/1992 | Hunter et al. . |
| 5,154,742 | 10/1992 | Gault et al. . |
| 5,238,474 | 8/1993 | Kahlbaugh et al. . |
| 5,290,330 | 3/1994 | Tepper et al. . |
| 5,306,321 | 4/1994 | Osendorf . |

FOREIGN PATENT DOCUMENTS

| | | |
|---|---|---|
| 208515 | 1/1987 | European Pat. Off. . |
| 3444387 | 7/1985 | Germany . |
| 630886 | 12/1961 | Italy . |
| 2152399 | 8/1985 | United Kingdom . |
| 2197802 | 6/1988 | United Kingdom . |
| 8907487 | 8/1989 | WIPO . |

OTHER PUBLICATIONS

Donaldson brochure entitled "Torit Mist Collectors", May 1984.
3M Brochure "Introducing FX–845. Scotchban Chemistry Takes on a New Element" 1991.

Primary Examiner—C. Scott Bushey
Attorney, Agent, or Firm—Merchant, Gould, Smith, Edell, Welter & Schmidt

[57] ABSTRACT

A mist collector cartridge for collecting airborne liquids, and more particularly, a filter media having vertically oriented interconnected pleats treated with a low surface energy material to facilitate agglomeration and drainage of liquid which accumulates on the inner and outer surface of the filter media.

4 Claims, 5 Drawing Sheets

PROCESS OF USING MIST COLLECTOR CARTRIDGE

This is a Division of application Ser. No. 08/107,967, filed Aug. 16, 1993, now U.S. Pat. No. 5,415,676.

FIELD OF THE INVENTION

The present application relates to a mist collector cartridge and a filter cartridge retention system. The present mist collector cartridge invention relates to a filter cartridge for collecting airborne liquids, and more particularly, a filter media having vertically oriented interconnected pleats treated with a low surface energy material to facilitate agglomeration and drainage of liquid which accumulates on the inner and outer surface of the filter media. The filter cartridge retention system relates to a mechanism for releasably retaining the filter cartridge between an operational position in fluid communication with an exhaust port in a filtration system and a released position for removal of the cartridge from the filtration system.

BACKGROUND OF THE INVENTION

The metal working industry utilizes various coolants and lubricants during cutting and forming operations. These fluids range-from pure oils, oil and water mixtures, and non-oils synthetics. Because of the forcefulness with which these fluids are applied during metal working operations and the heat generated where the cutting tool meets the workpiece, a fine mist or aerosol in the 0 to 2 micron range is generated. To arrest this mist, a high efficiency filter is required.

If the machine tool is free standing, the aerosol mist can be pulled away from the area using a hood over the cutting area. Alternatively, newer machine tools now employ enclosures around the cutting area, which allow the mist to be withdrawn from a single location.

Filters that have traditionally been used for mist collection originated in the heating, ventilation, and air conditioning (HVAC) industry. These filters generally incorporate a fiberglass mat with a synthetic non-woven layer on the backside for additional strength. This material can be fabricated in a variety of styles such as folded pockets, cassettes, etc., typically for use in a filtration cabinet.

A system widely in use for aerosol mist collection employs relatively thick filter bags which are folded into large pleats arranged with .respect to the airflow, also known as pocket style HVAC filters. .These pocket filters are typically not constructed with a separation structure, allowing the layers collapse under pressure.

The oil in the mist is absorbed by the relatively thick, porous pockets causing the bags to gradually become saturated with oil. The bags eventually collapse under the weight of the oil, causing the air to be forced through a smaller surface area. The reduced surface area of the filter increases air velocity through the filter, resulting in some of the oil being forced through the bags, contaminating the downstream air.

Consequently, these filters have a generally declining efficiency as the oil collects in the filter. As a result of the declining efficiency, the pressure drop across the filter does not increase, making it difficult to determine when the filter needs to be replaced. Disposal of such filters is also difficult because of environmental concerns over their oil content.

SUMMARY OF THE INVENTION

The present filter system collects airborne liquids in a filter media having vertical pleats with a separation therebetween. The separation between the vertical pleats is maintained by a pleat spacing arrangement. The filter media is treated with a low surface energy material so that liquids contacting the inner or outer surface of the media agglomerate and drain downward along the vertical pleats.

The low surface energy coating is preferably an aliphatic fluorocarbon.

Liquid which accumulates on the inner surface of the filter media drains downward into a bottom cover where it is diverted away from the downstream air.

The filter media preferably prevents airborne liquid from entering the downstream air. Consequently the filter media has increasing efficiency over time, which corresponds to a predictable change in pressure across the filter media over time. The predictable nature of the change in pressure across the filter media allows for predictive maintenance of the filter cartridge.

The filter cartridge may include a pre-filter wrap extending around the outer surface of the filter cartridge to cause the formation of larger droplets of the airborne liquid on the pre-filter wrap. These larger droplets more easily drain off of the filter cartridge.

A variety of pre-filter wraps are contemplated, including high loft air-laid or dry-laid materials, fully open cellular filtration foams, and fiber glass wool products.

The filter cartridge retention system relates to a mechanism for releasably retaining a filter cartridge within a filtration system between an operational position and a released position.

A support member is pivotally attached at one end within the filtration system for supporting the filter cartridge. End stops are provided on the support member for retaining the filter cartridge in proper alignment with an exhaust port in the filtration system. A handle is pivotally attached to the free end of the support member so that the support member can be moved between a generally horizontal operational position for engaging the filter cartridge with the exhaust port and a reclined released position which allows the filter cartridge to be slid in or out of the filtration system. In order to move the support member to the generally horizontal position, the handle is pivoted beyond the vertical position to insure that the filter cartridge is locked into position.

A compression gasket is preferably interposed between the filter cartridge and the exhaust port to ensure a fluid-tight fit of the filter cartridge within the filtration system.

The handle is moved to a generally horizontal position in order to move the support member to the reclined released position. In this configuration, the handle operates as a slide ramp extension for the support member to facilitate insertion and removal of the filter cartridge from the filtration system. As a safety feature, when the pivot handle is in the horizontal-released position, the door on the filtration system can not be closed.

DETAILED DESCRIPTION OF THE PREFERRED EMBODIMENT

Figure 1:
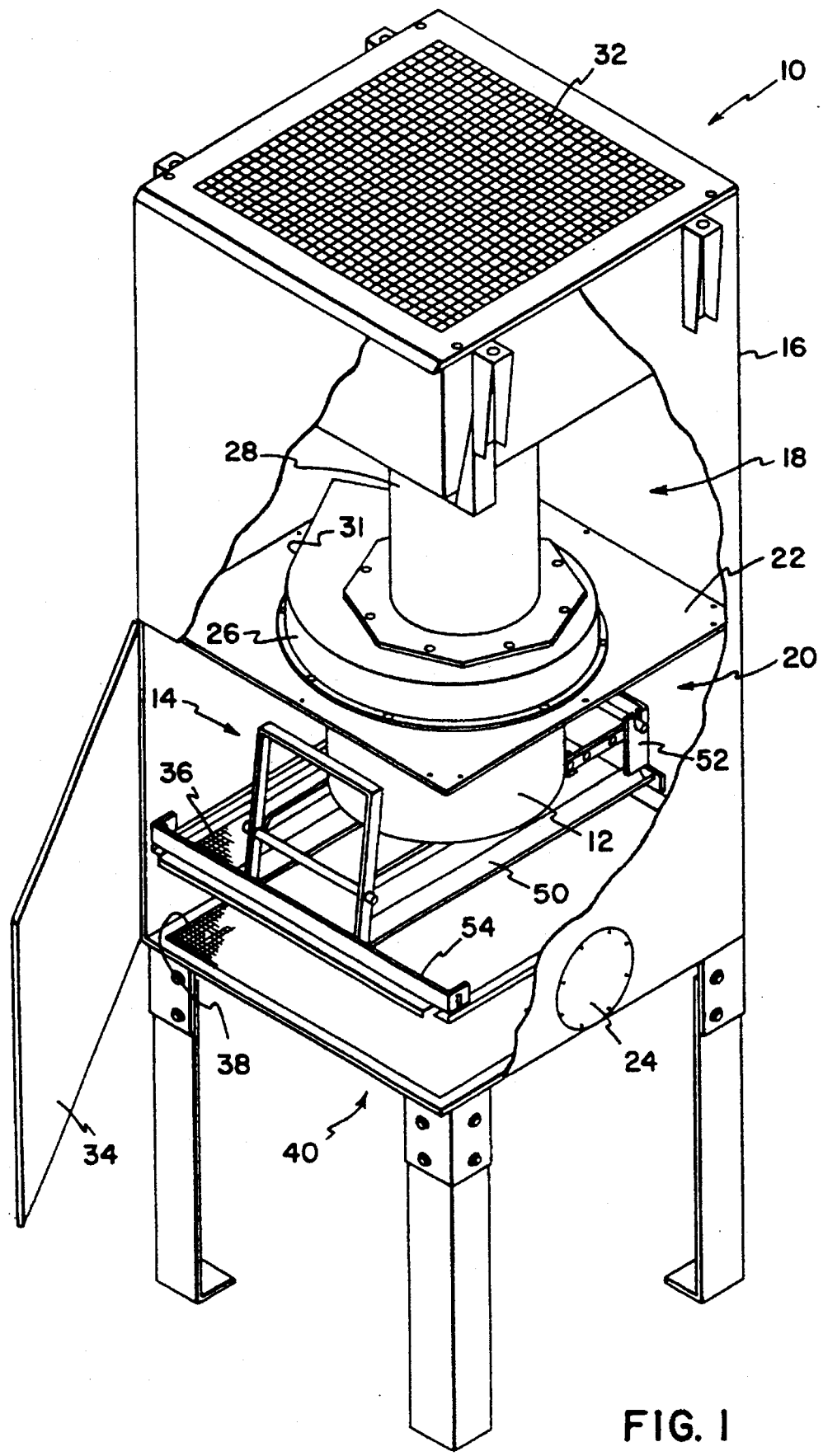
FIG. 1 illustrates a perspective view of a preferred mist collection system utilizing the preferred filter cartridge retention mechanism and mist collector cartridge.

FIG. 1 illustrates a mist collection system 10 for use with the preferred mist collector cartridge 12. It will be understood by those skilled in the art that the illustrated mist collection system 10 is set forth only by way of example and is not intended to limit the scope of the invention. It will also be understood that the preferred filter cartridge retention mechanism 14 and mist collector cartridge 12 may be used in any suitable filtration system and are not limited to the illustrated mist collection system 10.

The mist collection system 10 preferably comprises a housing 16 with an upper chamber 18 and lower chamber 20 separated by a dividing wall 22 having an exhaust port opening 30 (not shown). The upper chamber 18 preferably contains a blower housing 26 and motor 28 in fluid communication with the mist collector cartridge 12 by way of the exhaust port 30 (not shown).

A fan (not shown) in the blower housing 26 draws contaminated air into the lower chamber 20 through an air inlet port 24. The contaminated air is drawn through the sidewalls of the mist collector cartridge 12 and expelled through a blower opening 31 into the upper chamber 18. As pressure in the upper chamber 18 increases, the filtered air is forced through an outlet port 32 in the top of the mist collection system 10. A high efficiency particulate air (HEPA) filter (not shown) may be installed proximate the outlet port 32 in the upper chamber 18 as a final stage filter.

A door 34 is provided on the front of the lower chamber 20 through which the mist collector cartridge 12 can be inserted or removed. An upper screen 36 and lower screen 38 are preferably located in the lower chamber 20 of the mist collection system 10 above and below the air inlet port 24, respectively. The upper and lower screens 36,38 prevent particulates, such as metal shavings, from being drawn into the mist collection cartridge 12 or from falling into a hopper 40 at the bottom of the mist collection system 10.

The mist collector cartridge 12 is preferably retained in the lower chamber 20 of the mist collection system 10 by the filter retention mechanism 14. The preferred filter cartridge retention system 14 contains a pair of V-shaped angled slides 50 which extend from a rear pivot bracket 52 mounted on the rear of the mist collection system 10 to a front bracket 54 attached to the mist collection system 10 proximate the door 34.

Figure 2:
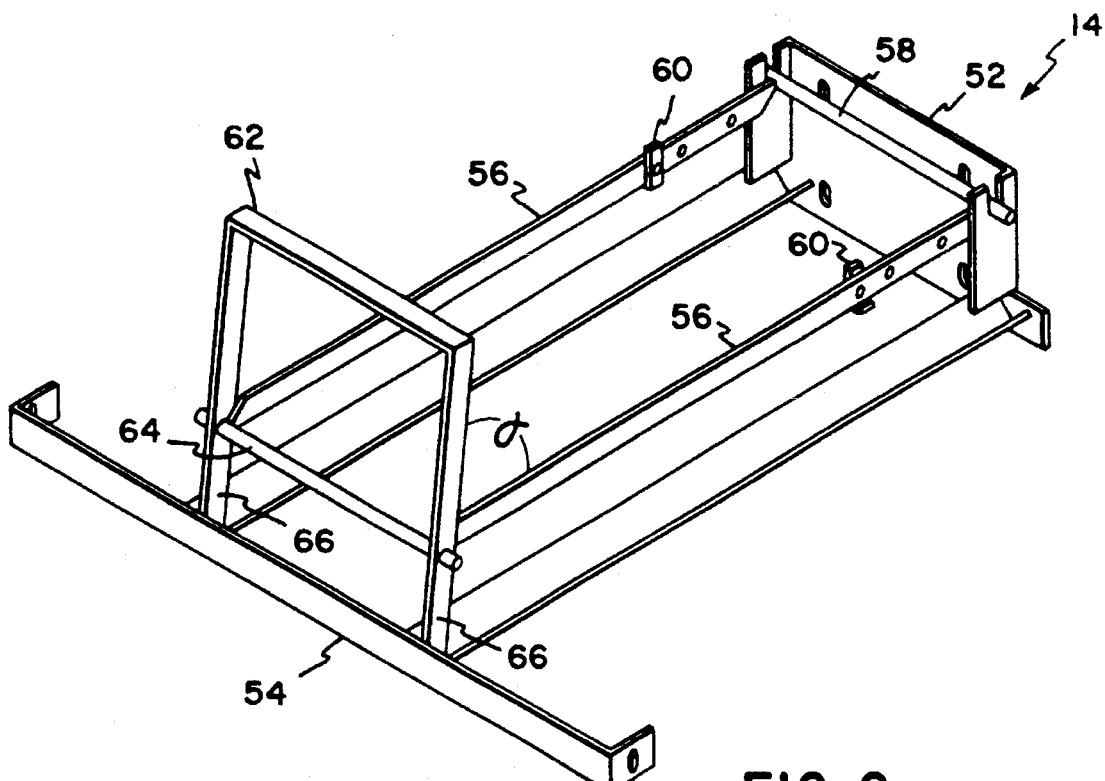
FIG. 2 is a perspective view of a preferred filter cartridge retention mechanism in the operational position.

FIG. 2 illustrates the preferred filter cartridge retention system 14 locked in the operational position. A pair of support members 56 are pivotally attached to the rear pivot bracket 52 by a rear pivot rod 58. A pair of filter cartridge end stops 60 are attached to the support members 56 so that the mist collector cartridge 12 is correctly position within the filtration system 10 in fluid engagement with the exhaust port 30 in the dividing wall 22 (See Fig. 1). An elongated handle 62 is pivotally attached to the free ends of the support members 56 by a front pivot rod 64. The handle 62 preferably has a pair of feet 66 which simultaneously rest in the angle slides 50 and are wedged against the front bracket 54. The length of the support members 56 is determined so that the angle σ of the handle 62 with respect to the support members 56 is less than 90°. Consequently, the filter cartridge retention system 14 is capable of exerting significant upward force on the filter cartridge 12 without a danger of disengagement. The feet 66 of the handle 62 are preferably beveled (See FIG. 3) on the base of the handle 62 facilitate sliding in the angled slides 50. In the operational position, the beveled surfaces of the feet 66 rest securely against the back surface of the front bracket 54.

Figure 3:
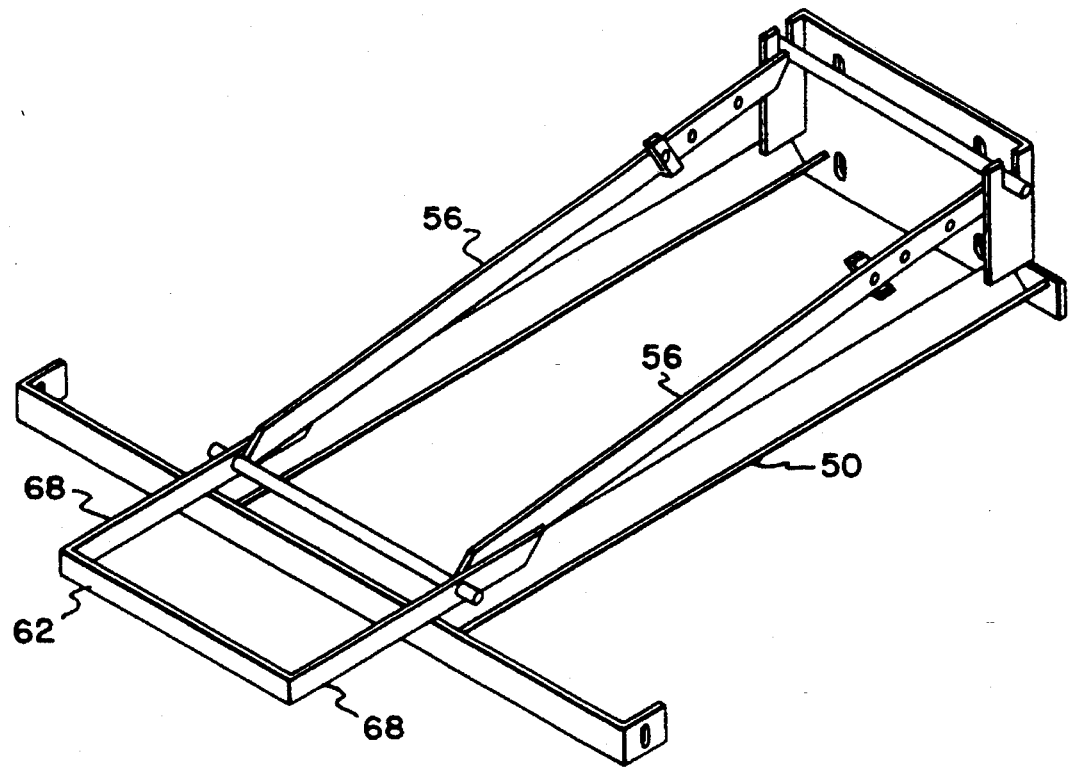
FIG. 3 is a perspective view of a preferred filter cartridge retention mechanism in the reclined and released position.

FIG. 3 illustrates the filter cartridge retention system 14 in a reclined or released position. The feet of the handle 66 ride in the V-shaped angled slides 50 as the handle 62 is moved forward away from the mist collector cartridge 12. When the handle 66 is in the horizontal position, the support members 56 are angled downward toward the door 34 to allow easy insertion or removal of a mist collector cartridge 12. The handle 62 operates as a extension 68 of the support members 56 to facilitate insertion and removal of a mist collector cartridge 12. When the handle is in the horizontal position, it extends out from the doorway, preventing the door 34 from being closed unless the filter cartridge retention system 14 is in the operational position.

It will be understood by those skilled in the art that the components of the filter cartridge retention system 14 can be changed or modified without departing from the spirit or scope of the invention. For example, the support members 56 may be replaced by a single rigid pivot member. Likewise, the handle may be configured as a solid member pivotally attached to a support members.

Figure 4:
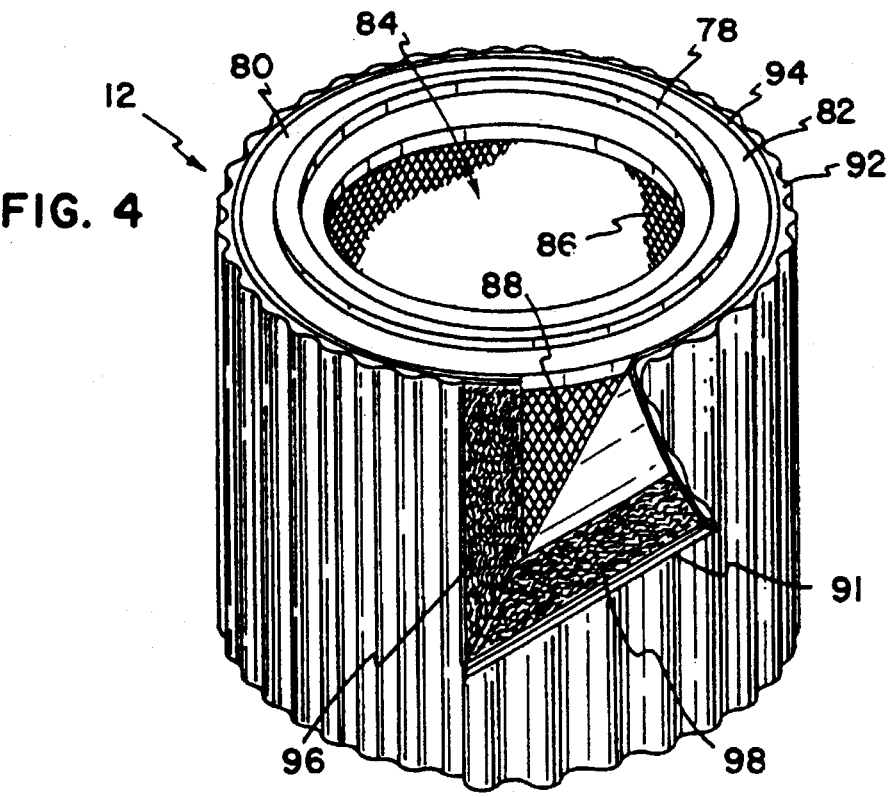
FIG. 4 is a perspective view of one embodiment of the mist collector cartridge with a multiple layer prefilter wrap.
Figure 5:
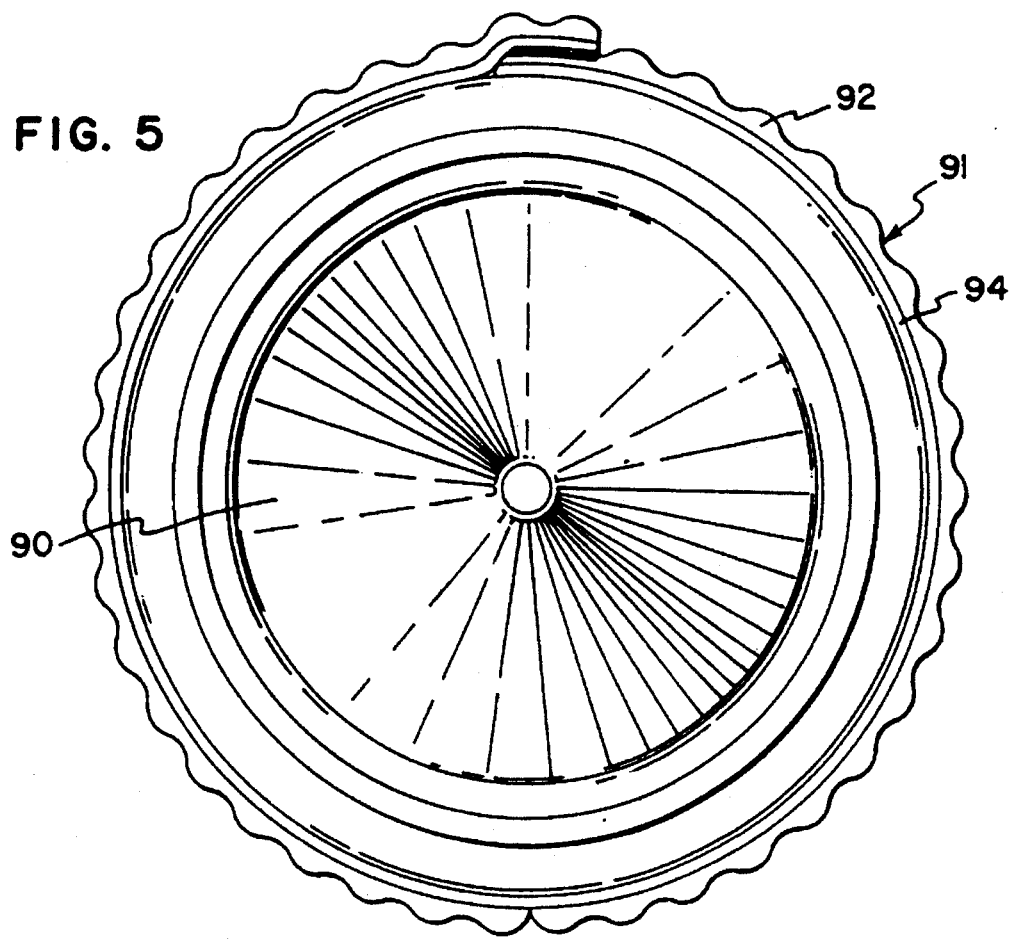
FIG. 5 is a top view of the mist collector cartridge of FIG. 4.

FIG. 4 illustrates an embodiment of the mist collector cartridge 12 of the present invention. Filter support members 80 preferably include a circular top member or top end cap 82 having a top opening 84, perforated inner and outer filter sidewalls or liners 86,88 and a bottom end cap 90 (See FIG. 5). The top end cap 82 preferably contains a compression gasket 78 to insure fluid tight engagement with the exhaust port 30. The support members 80 may be constructed of any suitable material, including metal or plastic.

The perforated outer filter sidewall 88 is preferably covered with a pre-filter wrap 91. The per-filter wrap illustrated in FIGS. 4 and 5 comprises a corrugated outer wrap 92 and a generally flat inner wrap 94. The inner and outer pre-filter wraps 92,94 may be joined by a seam (not shown) along hook and loop portions 96,98. Such hook and loop fasteners 96,98 are sold under the trade name VELCRO. The pre-filter wrap 91 is attached to the filter support members 80 by use of the hook and loop fastener material 96,98 on the edges of the pre-filter wrap 91 (See FIG. 5).

The Ire-filter wrap 91 may be constructed of a foamed urethane material, also referred to as a fully open cellular filtration foam. A foam material suitable for this purposes available under the trade name Filter Foam from Scott Foam Inc., Chester, PA. The outer wrap 92 is preferably more porous than the inner wrap 94, allowing it to hold a greater quantity of liquid. The outer wrap 92 is preferably 0.75" thick, with approximately 45 pores/inch. The inner wrap 94 is preferably 0.25" thick with approximately 100 pores/inch. In operation, the foamed urethane wrap 91 holds liquid, but does not build resistance to air flow.

Figure 6:
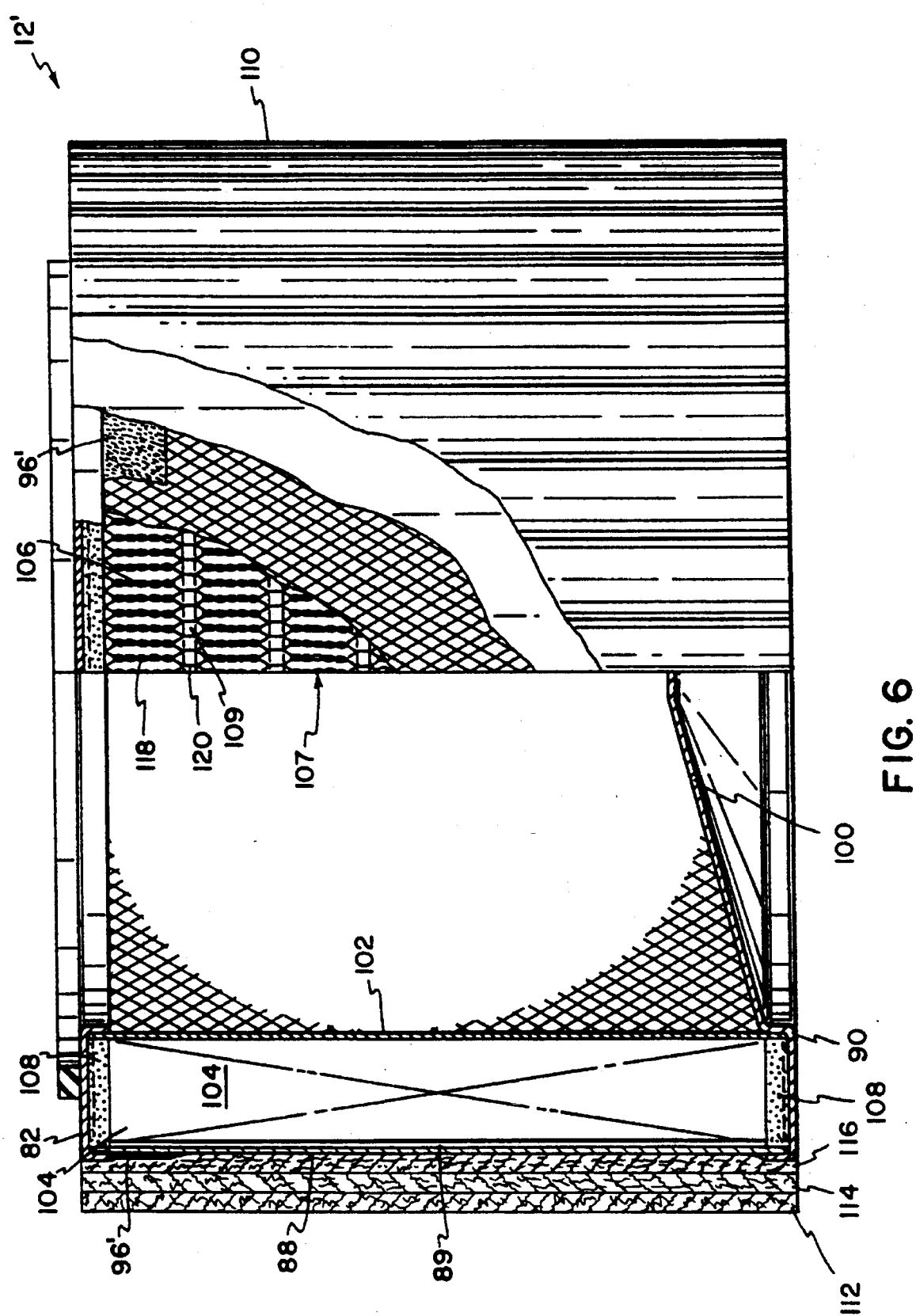
FIG. 6 is a sectional view of the preferred mist collector cartridge using multiple layers of non-woven air-laid material as a pre-filter wrap.

FIG. 6 illustrates a sectional view of the preferred mist collector cartridge 12' of the present invention. The bottom end cap 90 preferably has a sloped portion 100 which allows oil that is collected on the inner surface 102 of cartridge 12' to drain through filter media 104 and into the hopper 40.

The filter media 10 preferably comprises a synthetic glass and polyester material arranged to form a cylindrical pleated filter cartridge. The filter media 104 preferably has a high efficiency, between 70 and 90 percent at 0.778 micron particles.

To keep pleats 107 correctly spaced, the filter media 104 is cored to create alternating rectilinear line portions 118 and curvilinear line portions 120. During the corrugation process, dimples 109 are integrally formed in the filter media 104 along the pleat tips 106 to maintain the spacing between the pleats 107. Construction of a corrugated filter media of this type is disclosed in U.S. Pat. No. 4,452,619, issued to Wright et al. on Jun. 5, 1984, which is hereby incorporated by reference into this specification.

As will be discussed below, as dirt and oil accumulate on the filter media 104, the media 104 become partially clogged so that the air flowing through the filter media 104 accelerates to create additional pressure on the filter media 104. In order for the filter media 104 to withstand the increased pressure, the pleats 107 are preferably space more closely together than on an air filter, giving the filter media 104 additional structural integrity. Because pleats on an ordinary air filter are generally spaced further apart, they would probably collapse under the air pressure in the present mist collection system.

The filter media 104 is preferably a low surface energy synthetic fiber matrix constructed from fibers having a thickness of less than 0.030". The filter media 104 may be treated with a low surface energy material, such as an aliphatic fluorocarbon. One low energy coating suitable for this purpose is sold under the trade name Scotchguard® or Scotchban® Protector, by 3M Corporation, St. Paul, Minn. Scotchban® Protector is described in brochure entitled *Introducing FX-845 Scotchban Chemistry Takes On A New Life*, dated 1991, which is hereby incorporated by reference into this specification. Low surface energy coatings and low surface energy materials create a low Surface energy on the filter media 104 which facilitates agglomeration of the oil and promotes drainage. The pre-filter wraps 91, 110 may also be treated with a low surface energy material.

As is illustrated in FIG. 6, the filter media 104 is preferably recessed or set back from the inside surface of the outer liner 88 so that a space 89 is formed between the outer liner 88 and the filter media 104. The space 89 allows most of the oil that penetrates the prefilter wrap 91 to form droplets on the inside surface of the pre-filter wrap 91 or the outer liner 88, rather than on the filter media 104.

The pleats 106 are arranged vertically in the cartridges 1212'. The filter media 104, and inner and outer liners 86, 88 are retained in the top and bottom end caps 82, 90 by a filter media adhesive 108, such as plastisol. The hook portion 96' of a fastener material may be retained between the outer liner 88 and the top end cap 82 around the perimeter of the mist collector cartridge 12' by the adhesive 108. The pre-filter wrap 91 may then be attached directly to the mist collector cartridge 12, 12'.

Oil mist too fine to collect on the outside surface of the filter media 104 may emerge on the inner surface 102 of the pleats 106. The vertical pleats 106 allow liquid collected on the inner surface 102 to drain downward onto the bottom end cap 90 of the cartridges 12,12', where it passes through the filter media 104 and into the hopper 40.

Figure 7:
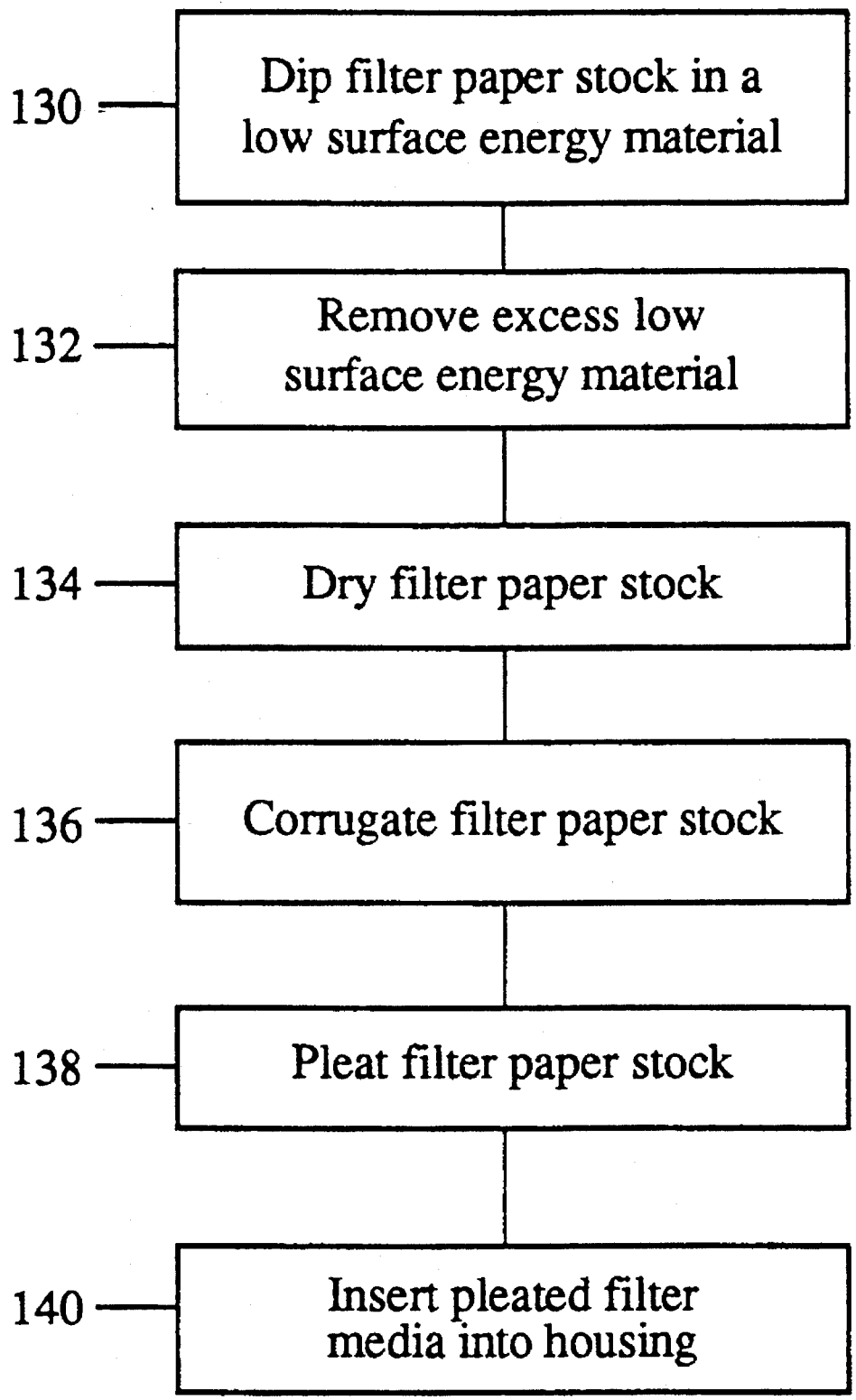
FIG. 7 is a flow chart illustrating the method of manufacturing the preferred mist collector cartridge.

The filter media 104 is preferably constructed according to the flow chart illustrated in FIG. 7. The flat filter paper stock is preferably dipped in a low surface energy coating material 130, such as an aliphatic fluorocarbon. It should be understood that the paper stock may be treated or wetted by a variety of methods, including spraying. The excess coating material is removed by compressing the coated paper stock between a pair of compression rollers 132. The coated paper stock is then dried in a convection drying oven 134.

Prior to pleating, the paper stock is corrugated 136 by pressing a series of grooves lengthwise along the paper with a heated roller. The paper stock is then pleated 138 to form the filter media 104 and inserted into a filter housing 140. The preferred corrugation process is disclosed in U.S. Pat. No. 4,452,619, issued to Wright et al., previously incorporated by reference into this specification. It will be understood that the cylindrical filter cartridge illustrated herein is set forth by way of example only and that a variety of filter configurations are possible. For example, generally planar filter cartridges having suitable drainage mechanism may be used in place of the cylindrical cartridge.

FIG. 6 also illustrates the preferred pre-filter wrap 110 of the present invention. The pre-filter wrap 110 is preferably constructed of multiple layers of non-woven air-laid mediums, such as high loft air-laid or dry-laid materials. Because of the nature of the pre-filter wrap 110, it may be attached directly to the hook portion 96' without the use of the mating hook-portion.

In the preferred embodiment, the outer pre-filter layer 112 is approximately 0.75" of open material having a density of 6.7 ounces/sq.yd. and a solidity of 0.8%. A product meeting these specifications is sold under the trade name Airlaid Media by Comulus Fiber Corp. located in Charlotte, N.C. The two inner layers 114,116 are approximately 0.25" of a high efficiency material having a density of 3.62 ounces/sq.yd. and a solidity of 1.6%. A product meeting these specifications is available from Chemwove Corp. in Charlotte, N.C.

The preferred pre-filter wrap 110 accumulates oil during operation of the mist collection system 10. As oil accumulates, the pressure drop across the filters 12,12' increases. When the motor 28 in the blower housing 26 is turned-off, the oil accumulated in the pre-filter wrap 110 drains downward into the hopper 40. After the oil has drained, the pressure drop across the filters 12,12' is reduced, thereby extending filter life.

In an alternate embodiment, the pre-filter wrap may be constructed of fiberglass or fiberglass wool filter media of various thicknesses and efficiencies, sold under the trade name Fiberglass Wool, by Schuller Filtration Corp. located in Vienna, West Virginia. Fiberglass materials hold oil and increases the pressure drop across the filter as oil accumulates. By replacing the fiberglass pre-filter wrap periodically, the life of the filter media 104 may be extended.

Due to the low surface energy of the filter media 104, the media 104 retains less oil. In actual operation, oil droplets formed on the outside surface of the filter media 104 drain downward by gravity into the collection hopper 40. Any oil that passes through the media 104 and agglomerates on the inside surface 102 drains by gravity to the sloped portion of the bottom end cap 90 and passes back through the filter media 104 into the hopper 40. The agglomeration of the oil on the inside and outside surface of the media 104, in combination with the vertically oriented pleats 106, ensures that almost no oil is bled into the downstream air. Thus, the filter media 104 does not absorb the oil, but instead separates it and drains it off so that it can be collected and disposed of apart from the filter 12. In some applications, it is possible to recycle the collected fluid.

Further, because the filter media 104 is pleated, it has a large surface area which allows air flowing through the media 104 to move at a low velocity, reducing the tendency of oil to be blown off the inner surface 102 of the filter 12 into the downstream air.

In the preferred embodiment, the efficiency and pressure drop across the cartridges 12,12' increase over time. The mist collector cartridge 12,12' function for a long period of time because the media 104 does not become saturated with oil. As the filters 12,12' become clogged with dirt and other particulates, the efficiency and the pressure drop across the filters 12,12' increases. Therefore, the pressure drop across the filter 12,12' corresponds to the amount of useful life remaining in the filters 12,12', which can be used to indicate when the filters 12,12' need to be replaced.

It will be understood by those skilled in the art that the present inventions are not limited to the examples discussed above, but may be changed or modified without departing from the spirit or scope of the invention. For example, a wide variety of filter cartridge configurations may be used in combination with a variety of drainage mechanisms. Further, it will be recognized that a variety of low surface energy fiber media may be utilized to facilitate the agglomeration and drainage of the collected oil.

What is claimed is:

1. A method for separating and collecting airborne liquids using a filtration system, comprising the steps of:
   a) providing a filter media having vertical pleats with a separation therebetween and pleat spacing means for maintaining the separation between the vertical pleats, the filter media having an air inlet surface and an air outlet surface;
   b) treating the filter media with filter treatment means for agglomerating liquids which contact the media to promote drainage of the liquid downward along the vertical pleats;
   c) forcing air containing the liquid from the air inlet surface of the filter media to the air outlet surface so that liquid is collected on the filter media; and
   d) collecting liquid which drains from the vertical pleats.

2. The method of claim 1 wherein the filter treatment means comprises a low surface energy coating material.

3. The method of claim 2 wherein the low surface energy coating material comprises an aliphatic fluorocarbon.

4. The method of claim 1 wherein the pleat spacing means are integrally formed in the filter media.

* * * * *